United States Patent [19]

Carlsson

[11] 4,145,604

[45] Mar. 20, 1979

[54] AUTOMATICALLY CONTROLLED ELECTRIC STEAM COOKING PAN

[75] Inventor: Richard Carlsson, Gothenburg, Sweden

[73] Assignee: AB Platslageriet Rostfri, Gothenburg, Sweden

[21] Appl. No.: 830,836

[22] Filed: Sep. 6, 1977

[30] Foreign Application Priority Data

Sep. 8, 1976 [SE] Sweden .............................. 7609892

[51] Int. Cl.² .......................... A47J 27/06; H05B 3/60
[52] U.S. Cl. .................................... 219/439; 219/287; 219/326; 219/332; 219/496
[58] Field of Search ........ 219/439, 430, 326, 271–276, 219/284–295, 327, 496, 332

[56] References Cited

U.S. PATENT DOCUMENTS 1,887,533  11/1932  Williams ......................... 219/289 X

FOREIGN PATENT DOCUMENTS 1155892  10/1963  Fed. Rep. of Germany ........... 219/439
1249480   9/1967  Fed. Rep. of Germany ........... 219/439
  97184  10/1939  Sweden .................................... 219/284
1249480   9/1967  Sweden .................................... 219/439

Primary Examiner—A. Bartis
Attorney, Agent, or Firm—Holman & Stern

[57] ABSTRACT

A steam heated cooking pan comprises in combination a double-mantled food preparation vessel arranged above a steam generator which includes an outer vessel and an open bottom inner vessel enclosed in the outer vessel and in which are disposed steam generating electrodes. A steam exhaust opening is provided at the upper end of the inner vessel for supplying steam to the double-mantled vessel. Steam generation is automatically controlled by a movable cover opening and closing the steam exhaust opening in response to steam pressure sensed by a pressure sensitive member arranged below the outer vessel and coupled to the cover by an actuating rod passing through a tube secured to the bottom of the outer vessel and extending upwardly to the opening. The tube communicates the pressure sensitive member with the inner vessel and prevents contact between the water in the steam generator and the pressure sensitive member and actuating rod thereby preventing deposition of time thereon.

4 Claims, 1 Drawing Figure

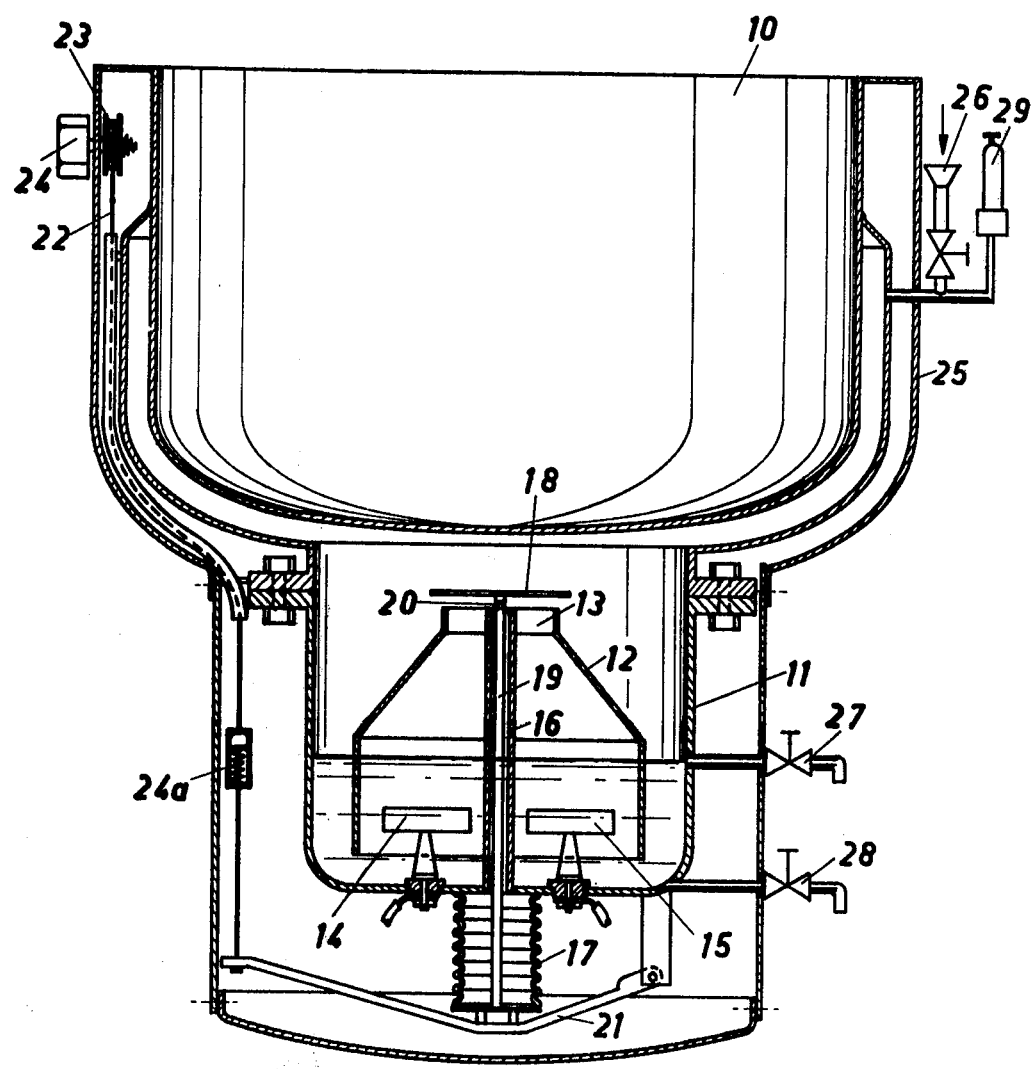

AUTOMATICALLY CONTROLLED ELECTRIC STEAM COOKING PAN

BACKGROUND OF THE INVENTION

The present invention refers to a steam heated cooking pan comprising in combination in a double-mantled food preparation vessel arranged above a steam generator, which includes an outer vessel and an inner vessel enclosed in said outer vessel and being open at its lower end whereas it is provided with an opening at its upper end and a moveable cover disposed for closing said opening at a predetermined pressure, said cover being acted upon by a pressure sensitive member.

Cooking pans of this kind are mainly used in catering services and they give a uniform heating of the contents of the pan. A substantially even temperature is furthermore maintained.

At earlier known cooking pans of this kind the bellows-formed pressure sensitive member is arranged at the side of the outer vessel in level with the opening in the inner vessel. The bellows will be in contact with the steam via a sleeve extending a distance into the outer vessel. A spring-loaded rod arranged to extend through the sleeve, transfers the motions of the bellows to the cover, which via a pivot pin is connected to the rod. The bellows is mounted between an outer casing and a member displaceable therein, the rod also being connected to said member. A spring is arranged to compensate and damp the movement of the rod. The outer casing comprises two parts arranged in screw thread engagement with each other, and these two parts can be displaced relative to each other by being rotated relative to each other, in such a manner that the rod will be displaced whereby the cover is opened more or less. The bellows is expanded at a pressure increase and it thereby will cause the member to be displaced in the casing together with its interconnected rod until the cover has been closed. The pressure inside the inner vessel of the steam generator will then increase heavily when the cover is closed and it will force the water into the outer vessel, whereby the water heating electrodes, which are located in the inner vessel, will be drained and the current supply is interrupted.

When the pressure has been sufficiently reduced the current circuit will be closed again and the cover is opened. The heating is in this manner self-adjusting.

This device has certain drawbacks, as deposits e.g. of lime from the warm water in the outer vessel are formed in the sleeve connecting the bellows with the outer vessel. These deposits may cause the movement of the rod to become more difficult or even obstructed, which will result in an unsatisfactory adjustment of the cooking pan. The deposits also cause problems at the pivot pin connecting the rod and the cover, and can mean that it is not possible to obtain an accurate closing of the cover. To clean or rinse the device from these deposits is time-wasting and inconvenient.

SUMMARY OF THE INVENTION

The purpose of the present invention is to design a cooking pan of the kind mentioned hereabove, in such a manner that there are no deposits of lime or the like, which cause stowing up, which will deteriorate the function of the adjustment means.

It is furthermore a desire to provide a more simple and reliable structure than the one described above.

This task has been solved according to the invention thereby that a tube is arranged to extend from the bottom of the outer vessel through the inner vessel up to the opening of said inner vessel, and that the pressure sensitive member is arranged adjacent the lower end of the tube and being connected to the cover via a rod adapted to extend through the tube.

BRIEF DESCRIPTION OF THE DRAWING

The drawing shows a vertical section through a cooking pan according to the invention.

DESCRIPTION OF THE PREFERRED EMBODIMENT

The cooking pan includes a double-mantled food preparation vessel 10 arranged above a steam generator, which includes an outer vessel 11 and an inner vessel 12 arranged concentric in said outer vessel and being open at its lower end and provided with an opening 13 at its upper end. The steam generator is filled with water up to a certain level and a pair of electrodes 14 and 15 are provided for heating the water. The electrodes 14 and 15 are arranged inside the inner vessel 12, whereby the steam generated by the boiling water will escape through the opening 13 to fill the space above the water level in the outer vessel 11 and also the space between the two mantles of the double-mantled food preparation vessel 10.

A tube 16 extends from the bottom of the outer vessel 11 up through the inner vessel 12 to its opening 13. The tube 16 is arranged concentric in the inner vessel 12. A pressure sensitive bellows 17 is arranged adjacent the lower end of the tube 16, which bellows is acted upon by the pressure prevailing in the outer vessel 11 through tube 16. A cover 18 is via a rod 19 connected to the bellows 17, and it is arranged to close the opening 13 when the pressure in the outer vessel 11 exceeds a certain value. The rod 19 is led through the tube 16 and the bellows 17 is attached to the lower end of the tube. The cover 18 is preferably connected to the rod 19 via a ball joint 20, to allow the cover 18 to close the opening 13 in spite of possible irregularities at the edge of the opening due to deposits and the like. An adjustment device, which includes a lever 21 fixed to the bellows 17 and which can be pivoted in a vertical plane by extending or shortening an elongated flexible member e.g. a chain 22 or the like, is provided for adjustment of the distance between the cover 18 and the opening 13 i.e. the steam exhaust area.

A more rapid or a slower heating of the content in the food preparation vessel 10 can be obtained in such a manner. One end of the chain 22 is wound around a roller 23 and can be wound onto or of the roller 23 by turning a wheel 24. A latch device (not shown) is provided to lock the roller 23 in certain positions. A spring 24a gives the lever 21 a certain possibility of movement at volume changes of the bellows 17.

The entire cooking pan is enclosed in an outer casing 25. Water is filled through the filler device 26 and the tap 27 is used for indicating that a desired water level has been reached. The tap 28 is used for draining the system of all water. A relief valve 29 is adapted to open when a certain pressure is exceeded.

The cooking pan functions in the following manner. The electrodes 14 and 15 heat the water in the inner vessel 12 until it is boiling. The steam escapes through the opening 13 to the outer vessel 11 and the space between the two mantles of the food preparation vessel 10. The condensed steam flows back into the outer vessel 11. Steam will also urge its way down through the tube 16 and acts upon the bellows 17, whereby this expands and acts to pull the cover 18 closer to the opening 13. When a certain pressure has been reached in the outer vessel 11 the cover 18 is closed completely, whereby the pressure rapidly will rise in the inner vessel 12. The water in the inner vessel 12 thereby is pressed away and it is forced to raise in the outer vessel 11, whereby the electrodes will become dry and the current circuit and thereby the current supply are interrupted. The current circuit is again closed and the cover 18 is opened when the pressure has dropped to a certain level.

In the design proposed water will never enter the tube 16 and no deposits will be formed therein. The device is therefore very reliable. The invention is of course not limited to the embodiment shown but a plurality of modifications are possible within the scope of the claims.

What I claim is:

1. A steam-heated cooking pan comprising in combination a double-mantled food preparation vessel arranged above a steam generator, said steam generator comprising:

an outer vessel;

an inner vessel enclosed in said outer vessel, said inner and outer vessels being in communication with the space between the walls of said double-mantled food preparation vessel, said inner vessel being open at its bottom and being provided with a steam exhaust opening at its top, said open bottom of the inner vessel being spaced from the bottom of the outer vessel;

a pressure sensitive member below said outer vessel, said outer vessel, the space between the wall of said double mantled food preparation vessel and said pressure-sensitive member all forming a sealed space;

a pair of spaced electrodes for generating steam being disposed within the inner vessel at a position intermediate the top and bottom thereof;

a movable cover being disposed for closing the opening at the top of the inner vessel at a predetermined pressure, said cover being acted upon by said pressure-sensitive member;

a tube arranged to extend from the pressure-sensitive member through the bottom of said outer vessel and to the opening at the top of said inner vessel, said tube permitting communication between said pressure-sensitive member and said inner vessel; and a rod operatively interconnecting said pressure-sensitive member and said cover, said rod extending through said tube.

2. A cooking pan as claimed in claim 1, in which said inner and outer vessels are concentric and said tube is arranged concentric with the outer and inner vessels respectively.

3. A cooking pan as claimed in claim 1, wherein an adjustment device is provided for adjusting the position of the cover relative to the opening of the inner vessel, whereby the steam exhaust area of said opening may be selectively adjusted.

4. A cooking pan as claimed in claim 3, in which the adjustment device includes a vertically pivotable lever having one end pivotally connected to a fixed abutment, said lever being connected to the pressure sensitive member and having a free end, and an elongated flexible member which is connected to the free end of the lever and has its opposite end wound around a rotatable roller, said elongated flexible member being provided with a resilient portion allowing the lever to make small pivot movements at volume changes in the pressure sensitive member.

* * * * *